(12) United States Patent
Dahn et al.

(10) Patent No.: US 7,196,140 B2
(45) Date of Patent: Mar. 27, 2007

(54) HIGHLY FLOWABLE PROPYLENE BLOCK COPOLYMERS

(75) Inventors: Ulrich Dahn, Mannheim (DE); Wolfgang Bidell, Mannheim (DE); Hans-Jürgen Zimmermann, Bensheim (DE); Roland Hingmann, Ladenburg (DE); Joachim Rösch, Ludwigshafen (DE); Günther Schweier, Friedelsheim (DE); Jürgen Oelze, Ludwigshafen (DE)

(73) Assignee: Basell Poliolefine Italia S.p.A., Milan (IT)

( * ) Notice: Subject to any disclaimer, the term of this patent is extended or adjusted under 35 U.S.C. 154(b) by 42 days.

(21) Appl. No.: 10/296,256

(22) PCT Filed: May 23, 2001

(86) PCT No.: PCT/EP01/05911

§ 371 (c)(1),
(2), (4) Date: May 20, 2003

(87) PCT Pub. No.: WO01/90208

PCT Pub. Date: Nov. 29, 2001

(65) Prior Publication Data

US 2005/0038208 A1   Feb. 17, 2005

(30) Foreign Application Priority Data

May 25, 2000   (DE) ................. 100 25 727

(51) Int. Cl.
C08F 297/08 (2006.01)
C08F 297/00 (2006.01)
C08F 4/64 (2006.01)
C08F 4/642 (2006.01)

(52) U.S. Cl. .............. 525/247; 525/240; 525/244; 525/323; 525/268; 526/348; 526/351; 526/158

(58) Field of Classification Search ............ 525/247, 525/240, 244, 323, 268, 526, 158; 526/348, 526/351, 158
See application file for complete search history.

(56) References Cited

U.S. PATENT DOCUMENTS

| 4,454,299 | A | 6/1984 | Scheiger et al. ........... 525/268 |
| 4,455,405 | A | 6/1984 | Jaggard et al. ............. 525/53 |
| 4,621,952 | A | 11/1986 | Aronson .................. 406/138 |
| 4,902,483 | A | 2/1990 | Raufast .................... 422/134 |
| 4,977,210 | A | 12/1990 | Kerth et al. ................ 525/53 |
| 5,280,074 | A | 1/1994 | Schreck et al. ............. 525/240 |
| 5,639,822 | A | 6/1997 | Hungenberg et al. ........ 525/53 |
| 5,672,658 | A | 9/1997 | Oka et al. .................. 525/53 |
| H1722 | H | 4/1998 | Goode et al. .............. 525/323 |
| 6,005,034 | A | 12/1999 | Hayashida et al. .......... 524/117 |
| 6,204,336 | B1 | 3/2001 | Hirakawa et al. ........... 525/244 |
| 6,300,434 | B1 | 10/2001 | Schwager et al. .......... 526/129 |
| 6,466,875 | B1 * | 10/2002 | Mitsutani et al. ............ 702/22 |

FOREIGN PATENT DOCUMENTS

| DE | 38 27 565 | 2/1990 |
| DE | 40 04 087 | 8/1991 |
| EP | 0 208 330 | 1/1987 |
| EP | 0 357 394 | 3/1990 |
| EP | 0 363 167 | 4/1990 |
| EP | 0 457 455 | 11/1991 |
| EP | 0 515 879 | 12/1992 |
| EP | 0 534 776 | 3/1993 |
| EP | 0739 917 A1 | 10/1996 |
| EP | 0 749 992 | 12/1996 |
| EP | 0 790 262 A1 | 8/1997 |
| EP | 0739 917 B1 | 1/1999 |
| EP | 0 790 262 B1 | 5/2000 |
| WO | WO 98/30611 | 7/1998 |
| WO | WO 98/58975 | 12/1998 |
| WO | WO 98/58976 | 12/1998 |

OTHER PUBLICATIONS

Chatterjee, "Effect of Ethylene-Propylene Rubber Concentration and Composition on the Properties of UNIPOL Polypropylene Impact Copolymer Cast Film" J. Plastic Film & Sheeting 15, pp. 72-81 (1999).

(Continued)

Primary Examiner—James J. Seidleck
Assistant Examiner—Olga Asinovsky
(74) Attorney, Agent, or Firm—Novak Druce & Quigg LLP

(57) ABSTRACT

The invention relates to highly flowable propylene block copolymers that comprise 50 to 80 wt.-% of a propylene homopolymer and 10 to 70 wt.-% of a propylene copolymer having 5 to 50 wt.-% of a $C_2$–$C_8$ alk-1-ene polymerized into it that is different from propylene, and that are obtainable from the gaseous phase by a two-step polymerization by means of a Ziegler-Natta catalyst system. In a first polymerization step, the propylene is polymerized at a pressure of 10 to 50 bar, a temperature of 50 to 100° C. and an average dwelling time of the reaction mixture of 0.3 to 5 hours in the presence of at least 2.0% by volume, based on the total volume, of hydrogen. The propylene homopolymer obtained in said first polymerization step is transferred together with the Ziegler-Natta catalyst system into an intermediate container, expanded for 0.01 to 5 minutes to less than 5 bar and maintained at a temperature of 10 to 80° C. The pressure in the intermediate container is then increased by 5 to 60 bar by introducing under pressure a gaseous mixture, and the propylene homopolymer is then transferred to a second polymerization step together with the Ziegler-Natta catalyst system. In said second polymerization step, a mixture from propylene and a $C_2$–$C_8$ alk-1-ene is polymerized into the propylene homopolymer at a pressure of 10 to 50 bar, a temperature of 50 to 100° C. and an average dwelling time of 0.5 to 5 hours. The weight ratio between the monomers reacted in the first and those reacted in the second polymerization step are adjusted to be in the range of from 4:1 to 1:1.

8 Claims, No Drawings

OTHER PUBLICATIONS

Polyolefins 2000, Feb. 27-Mar. 1, 2000, pp. 109-124 (International Conference Houston, TX).

Moore (Ed.), Propylene Handbook, pp. 242, 243, 343 (1996) [ISBN 3-446-18176-8].

Deanin, Polymer Structure, Properties and Applications, p. 420 (1972) [ISBN 0-8436-1202-9].

"*Resin Conveying System*" IBM. Technical Disclosure Bulletin 40(09), pp. 179-181 (1997).

Albizzatl et al., "*Sequential Copolymerization*", pp. 92 ,93 and 149 from the "*Polypropylene Handbook*", Ed. E.P. Moore, Jr., Hauser Publishers, 1996.

\* cited by examiner

HIGHLY FLOWABLE PROPYLENE BLOCK COPOLYMERS

The present invention relates to highly flowable propylene block copolymers, comprising 50 to 80 wt.-% of a propylene homopolymer and 20 to 50 wt.-% of a propylene copolymer, with 10 to 70 wt.-% of a $C_2$–$C_8$ 1-alkene other than propylene polymerized into to it, this 1-alkene being obtainable by two-stage polymerization by means of a Ziegler-Natta catalyst system from the gas phase; in a first polymerization stage, propylene is polymerized at a pressure of 10 to 50 bar, a temperature of 50 to 100° C., and a mean dwell time of the reaction mixture of 0.3 to 5 hours in the presence of at least 2.0 vol.-% of hydrogen in proportion to the total volume, and then the propylene homopolymer obtained in the first polymerization stage is introduced along with the Ziegler-Natta catalyst system into an intermediate container, where it is first depressurized for 0.1 to 5 minutes to less than 5 bar and maintained at a temperature of 10 to 80° C., and then, by the introduction under pressure of a gas mixture, the pressure in the intermediate container is raised again by 5 to 60 bar, and the propylene homopolymer along with the Ziegler-Natta catalyst system is thereupon transferred to a second polymerization stage, where a mixture of propylene and a $C_2$–$C_8$ 1-alkene is added by polymerization to the propylene homopolymer at a pressure of 10 to 50 bar, a temperature of 50 to 100° C., and a mean dwell time of 0.5 to 5 hours, and the weight ratio between the monomers converted in the first and second polymerization stages, respectively, is adjusted to be is in the range of 4:1 to 1:1.

The present invention also relates to a method for producing highly flowable propylene block copolymers of this kind and to their use as films, fibers or molded bodies.

Propylene ethylene block copolymers obtainable by polymerization with Ziegler-Natta catalysts have already been described in numerous patents (U.S. Pat. Nos. 4,454,299 and 4,455,405, and German Patents DE-A 3 827 565 and DE-A 4 004 087). Such block copolymers are typically produced by a method in which first gaseous propylene is polymerized in a first polymerization stage, and the propylene homopolymer obtained from it is then brought to a second polymerization stage, where a mixture of propylene and ethylene is added to it by polymerization. The method is conventionally performed at elevated pressure and in the presence of hydrogen as a molar mass regulator. The propylene ethylene block copolymers obtainable by this method usually have good impact strength and rigidity.

Propylene block copolymers that have a high proportion of rubber, that is, block copolymers in which the copolymer obtained in the second polymerization stage represents a high proportion of the total block copolymer, can be obtained directly from the reactor, by the usual polymerization methods, only for relatively low melt flow rates. This is due, among other factors, to the fact that the high concentrations of hydrogen required to regulate the molar masses of the block copolymers are often not feasible in practical terms. Moreover, in the production of block copolymers with a high proportion of rubber and a relatively high melt flow rate, unwanted plating out is observed in the second polymerization stage, which is associated with problems of morphology of the products obtained. For these reasons, from a process standpoint it is quite difficult to produce rubber-rich propylene block copolymers that have both high impact strength and high flowability, or in other words whose melt flow rates have high values.

One possibility of producing rubber-rich propylene block copolymers that have high flowability is for rubber-rich propylene block copolymers to be subjected to a subsequent molar mass reduction with the aid of organic peroxides, as a result of which their melt flow rate and hence their flowability can be increased markedly. However, this kind of molar mass reduction requires a relatively complicated additional method step. Moreover, the use of organic peroxides has a number of disadvantages, among them increased emissions of low-molecular components, annoying odor, and sacrifices in terms of rigidity, thermostability, and softening behavior.

It was therefore the object of the present invention to overcome the disadvantages described and to develop highly flowable propylene block copolymers with a high rubber content which can be produced simply and without the use of peroxides, and which are distinguished, among other properties, by high impact strength and rigidity and good thermostability and flowability in the injection-molding field, and which moreover have only slight proportions of highly volatile components.

Accordingly, the novel highly flowable propylene block copolymers defined at the outset were discovered.

The propylene block copolymers of the invention comprise 50 to 80 wt.-%, and in particular 60 to 80 wt.-%, of a propylene homopolymer and 20 to 50 wt.-%, in particular 20 to 40 wt.-%, of a propylene copolymer, with 10 to 70 wt.-%, refer to the propylene copolymer, of a $C_2$–$C_8$ 1-alkene other than propylene that is added to it by polymerization. The proportion of $C_2$–$C_8$ 1-alkene polymerized into the propylene copolymer is in particular 20 to 60 wt.-%.

The term "$C_2$–$C_8$ 1-alkenes" is understood to mean linear and branched 1-alkenes, in particular ethylene, 1-butene, 1-pentene, 1-hexene, 1-heptene or 1-octene, as well as mixtures of these comonomers, with ethylene or 1-butene being used preferentially.

The propylene block copolymers of the invention can be obtained by two-stage polymerization from the gas phase.

The polymerization in both stages is effected by means of a Ziegler-Natta catalyst system. In particular, catalyst systems are used of the kind that besides a) a titanium-containing solid component also have b) cocatalysts in the form of organic aluminum compounds and c) electron donor compounds. The propylene block copolymers of the invention can be obtained in this way.

For producing the titanium-containing solid component (a), the halides or alcoholates of trivalent or quadrivalent titanium are used as titanium compounds; titanium alkoxy halogen compounds or mixtures of various titanium compounds can also be considered. Preferably, the titanium compounds that contain chlorine as the halogen are used. Also preferred are the titanium halides, which besides titanium contain only halogen, and above all, the titanium chlorides and in particular titanium tetrachloride.

The titanium-containing solid component (a) preferably contains at least one halogen-containing magnesium compound. Halogens are understood here to mean chlorine, bromine, iodine, or fluorine; bromine or in particular chlorine are preferred. The halogen-containing magnesium compounds are either used directly in the production of the titanium-containing solid component (a) or are formed in the production thereof. As magnesium compounds that are suitable for producing the titanium-containing solid component (a), the magnesium halides can be considered above all, such as magnesium dichloride or magnesium dibromide in particular, or magnesium compounds from which the halides can be obtained in the usual way, for instance by reaction with halogenating agents, such as magnesium alkyls, magnesium aryls, magnesium alkoxy compounds, or magnesium aryloxy compounds, or Gridnard compounds. Preferred examples of halogen-free compounds of magnesium that are suitable for producing the titanium-containing solid component (a) are n-butylethylmagnesium or n-butyloctylmagnesium. Preferred halogenation agents are chlorine or hydrogen chloride. However, titanium halides can also be used as halogenation agents.

Moreover, the titanium-containing solid component (a) expediently contains electron donor compounds, such as mono-or polyfunctional carboxylic acids, carboxylic acid anhydrides or carboxylic acid esters, and moreover ketones, ether, alcohols, lactones, or organic phosphorous or silicon compounds.

As the electron donor compounds within the titanium-containing solid component, carboxylic acid derivatives and in particular phthalic acid derivatives of the general formula (II)

[paste in (II)]

are preferably used, in which formula X and Y each stand for one chlorine or bromine atom or a $C_1$–$C_{10}$ alkoxy radical, or jointly stand for oxygen in the anhydride function. Especially preferred electron donor compounds are phthalic acid esters, in which X and Y stand for a $C_1$–$C_8$ alkoxy radical. Examples of phthalic acid esters that are preferably used are diethyl phthalate, di-n-butyl phthalate, diisobutyl phthalate, di-n-pentyl phthalate, di-n-hexyl phthalate, di-n-heptyl phthalate, di-n-octyl phthalate, or di-2-ethylhexyl phthalate.

Other preferred electron donor compounds within the titanium-containing solid component are diesters of 3- or 4-unit, optionally substituted, cycloalkyl-1,2-dicarboxylic acids, as well as monoesters of substituted benzophenone-2-carboxylic acids, or substituted benzophenone-2-carboxylic acids. In these esters, the usual alkanols in esterification reactions are used as the hydroxy compounds, such as $C_1$–$C_{15}$ alkanols or $C_5$–$C_7$ cycloalkanols, which in turn can have one or more $C_1$–$C_{10}$ alkyl groups, as well as $C_6$–$C_{10}$ phenols.

Mixtures of various electron donor compounds can also be used.

In the production of the titanium-containing solid component (a), as a rule per mol of the magnesium compound, from 0.05 to 2.0 mol, and preferably from 0.2 to 1.0 mol, of the electron donor compounds are used.

Furthermore, the titanium-containing solid component (a) can contain inorganic oxides as a vehicle. As a rule, a fine-particle inorganic oxide is used as the vehicle, which has a mean particle diameter of 5 to 200 µm, and preferably 20 to 70 µm. The term "mean particle diameter" is understood here to mean the volume-related mean value (median value) of the particle-size distribution determined by Coulter counter analysis.

Preferably, the particles of the fine-particle inorganic oxide are composed of primary particles that have a mean particle diameter of the primary particles of from 1 to 20 µm and in particular from 1 to 5 µm. The so-called primary particles are porous, granular oxide particles, which are generally obtained by grinding up a hydro gel of the inorganic oxide. It is also possible for the primary particles to be sieved before they are further processed.

The inorganic oxide that is preferably used is also characterized by having voids or channels with a mean diameter of 0.1 to 20 µm, in particular 1 to 15 µm, whose macroscopic volumetric proportion of the total particles is in the range from 5 to 30% and in particular in the range from 10 to 30%.

The determination of the mean particle diameter of the primary particles and of the macroscopic volumetric proportion of the voids and channels in the inorganic oxide is expediently effected by image analysis, using scanning electron microscopy, or electron probe microanalysis, in each case at particle surfaces and particle cross sections of the inorganic oxide. The pictures obtained are evaluated, and from that the mean particle diameter of the primary particles and the macroscopic volumetric proportion of the voids and channels are determined. The image analysis is preferably done by converting the electron microscopic data material into a gray-value binary image and by digital evaluation using a suitable electronic data processing program, such as the software analysis package produced by the corporation known as SIS.

The inorganic oxide to be preferably used can be obtained for instance by spray drying the ground hydro gel, which for that purpose is mixed with water or an aliphatic alcohol. Such fine-particle inorganic oxides are also available in commerce.

The fine-particle inorganic oxide furthermore typically has a pore volume of 0.1 to 10 $cm^3$/g, preferably 1.0 to 4.0 $cm^3$/g, and a specific surface area of 10 to 1000 $m^2$/g, preferably 100 to 500 $m^2$/g; these values are understood to be determined by mercury porosimetry under DIN 66133 and nitrogen adsorption under DIN 66131.

It is also possible to use an inorganic oxide whose pH value, that is, the negative base-10 logarithm of the proton concentration, is in the range from 1 to 6.5 and in particular in the range from 2 to 6.

As inorganic oxides, above all the oxides of silicon, aluminum, titanium, or one of the metals of the first or second primary group of the periodic system can be considered. As a particularly preferred oxide, besides aluminum oxide or magnesium oxide or a layer silicate, silicon oxide (silica gel) is used above all. Mixed oxides can also be used, such as aluminum silicates or magnesium silicates.

The inorganic oxides used as the vehicle contain water on their surface. This water is bonded, partly physically by adsorption and partly chemically in the form of hydroxyl groups. By thermal or chemical treatment, the water content of the inorganic oxide can be reduced or eliminated entirely; as a rule, in a chemical treatment, typical drying agents are used, such as $SiCl_4$, chlorosilane, or aluminum alkyls. The water content of suitable inorganic oxides amounts to from 0 to 6 wt.-%. Preferably, an inorganic oxide is used without further treatment, in the form in which it is available in commerce.

The magnesium compound and the inorganic oxide within the titanium-containing solid component (a) are preferably present in such quantities that, per mol of the inorganic oxide, from 0.1 to 1.0 mol, in particular from 0.2 to 0.5 mol, of the compound of magnesium are present.

In the production of the titanium-containing solid component (a), $C_1$ to $C_8$ alkanols, such as methanol, ethanol, n-propanol, isopropanol, n-butanol, sec-butanol, tert-butanol, isobutanol, n-hexanol, n-heptanol, n-octanol, or 2-ethylhexanol, or mixtures thereof, are also used as a rule. Preferably, ethanol is used.

The titanium-containing solid component can be produced by methods known per se. Examples are described, among others, in European Patent Disclosures EP-A 45 975, EP-A 45 977, EP-A 86 473, and EP-A 171 200, as well as British Patent GB-A 2 111 066, and U.S. Pat. No. 4,857,613 and 5,288,824. Preferably, the method known from German Patent Disclosure DE-A 195 29 240 is employed.

Suitable aluminum compounds (b), besides trialkylaluminum, are also compounds of the kind in which one alkyl group is replaced with an alkoxy group or a halogen atom, such as chlorine or bromine. The alkyl groups may be identical to one another or different. Linear or branched alkyl groups can be considered. Preferably, trialkylaluminum compounds are used, whose alkyl groups each have from 1.8 carbon atoms, examples being trimethylaluminum, triethylaluminum, triisobutylaluminum, trioctylaluminum, or methyldiethylaluminum, or mixtures thereof.

In addition to the aluminum compound (b), as a rule electron donor compounds (c) are used as further cocatalysts, such as mono- or polyfunctional carboxylic acids, carboxylic acid anhydrides or carboxylic acid esters, and also ketones, ether, alcohols, lactones, and organic phosphorous and silicon compounds; the electron donor compounds (c) may be the same as or different from the electron donor compounds used for producing the titanium-containing solid component (a). Preferred electron donor compounds are organic silicon compounds of the general formula (I)

$$R^1{}_n Si(OR^2)_{4-n} \qquad (I),$$

in which $R^1$ is the same or different and stands for a $C_1$–$C_{20}$ alkyl group, a 5- to 7-unit cycloalkyl group, which in turn can be substituted with a $C_1$–$C_{10}$ alkyl, a $C_6$–$C_{18}$ aryl group, or a $C_6$–$C_{18}$ aryl-$C_1$–$C_{10}$ alkyl group; $R^2$ is the same or different and stands for a $C_1$–$C_{20}$ alkyl group, and n stands for the whole numbers 1, 2 or 3. Especially preferably, compounds in which $R^1$ stands for a $C_1$–$C_8$ alkyl group or a 5- to 7-unit cycloalkyl group, and $R^2$ stands for a $C_1$ to $C_4$ alkyl group, and n stands for the numbers 1 or 2.

Among these compounds, dimethoxydiisopropylsilane, dimethoxyisobutylisopropylsilane, dimethoxydiisobutylsilane, dimethoxydicyclopentylsilane, dimethoxyisopropyl-tert-butylsilane, dimethoxyisobutyl-sec-butylsilane, and dimethoxyisopropyl-sec-butylsilane can be emphasized in particular.

Preferably, the cocatalysts (b) and (c) are used in a quantity such that the atomic ratio between aluminum from the aluminum compound (b) and titanium from the titanium-containing solid component (a) amounts to from 10:1 to 800:1, in particular from 20:1 to 200:1, and the molar ratio between the aluminum compound (b) and the electron donor compound (c) amounts to from 1:1 to 250:1, and in particular from 10:1 to 80:1.

The titanium-containing solid component (a), the aluminum compound (b), and the electron donor compound (c) that is as a rule used together form the Ziegler-Natta catalyst system. The catalyst ingredients (b) and (c) can be introduced into the polymerization reactor either together with the titanium-containing solid component (a), or as a mixture, or individually in an arbitrary order.

The method for producing the highly flowable propylene block copolymers of the invention is performed in two successive polymerization stages, that is, in a reactor cascade, in the gas phase. The usual reactors used for the polymerization of $C_2$–$C_8$ 1-alkenes can be used. Suitable reactors include among others continuous stirred tanks, loop reactors, or fluidized bed reactors. The size of the reactors is not of particular importance for the method of the invention. It depends on the output that is to be attained in the reaction zone or in the individual reaction zones.

As the reactors, both fluidized bed reactors and horizontally or vertically stirred powdered bed reactors are used in particular. In the method that is also according to the invention, the reaction bed generally comprises the polymer of $C_2$–$C_8$ 1-alkenes that is polymerized in the applicable reactor.

In an especially preferred embodiment, the method used to produce the propylene block copolymers of the invention is performed in a cascade of reactors connected in series with one another, in which the powdered reaction bed is kept in motion by a vertical stirrer; so-called freely supported helical stirrers are especially suitable. Such stirrers are known for instance from European Patent Disclosures EP-B 000 512 and EP-B 031 417. They are distinguished in particular in that they distribute the powdered reaction bed quite homogeneously. Examples of such powdered reaction beds are described in EP-B 038 478. The reactor cascade preferably comprises two series-connected tanklike reactors, provided with a stirrer and with a volumetric content of from 0.1 to 100 $m^3$, such as 12.5, 25, 50 or 75 $m^3$.

In the polymerization for producing the propylene block copolymers of the invention, their molar mass can be monitored and adjusted by means of the usual regulators in polymerization technology, such as hydrogen. Besides regulators so-called regulatory agents can be used, that is, compounds that vary the catalyst activity, or antistatic agents. These latter agents prevent plating out on the wall that could be caused by electrostatic charging.

In the first polymerization stage, for producing the propylene block copolymers of the invention, under the usual reaction conditions, propylene is polymerized at a pressure of 10 to 50 bar, in particular 15 to 40 bar, a temperature of 50 to 100° C., in particular 60 to 90° C., and a mean dwell time of 0.3 to 5 hours, in particular 0.8 to 4 hours. For regulating the molar mass of the propylene homopolymer obtained, the polymerization in the first polymerization stage is done in the presence of at least 2.0 vol.-%, and in particular at least 5.0 vol.-%, of hydrogen, referred to the total mixture present in the polymerization stage. The propylene homopolymer obtained in the first polymerization stage forms the so-called matrix for the propylene block copolymers of the invention and has a polydispersion index (PI) of preferably at least 2.8 and in particular at least 3.0.

Next, the propylene homopolymer obtained in the first polymerization stage, with the Ziegler-Natta catalyst system used, is removed from the first polymerization stage and transferred into an intermediate container. As the intermediate containers, the reactors or containers typically used for the polymerization of $C_2$–$C_8$ 1-alkenes are used. Suitable intermediate containers are for instance cylindrical tanks, stirring vessels, or cyclones.

In the intermediate container, the propylene homopolymer discharged from the first polymerization stage, together with the Ziegler-Natta catalyst system, is first depressurized for 0.1 to 5 minutes, in particular 0.2 to 4 minutes, to less than 5 bar, and preferably to less than 3.5 bar. During this period of time, per kg of the propylene homopolymer, 0.001 g to 10 g, in particular 0.001 g to 1.0 g of a $C_1$–$C_8$ alkanol can be added to the propylene homopolymer, for better regulation of the further polymerization step. Isopropanol is especially suited for this purpose, but ethanol or glycol is also suitable. The intermediate container is first maintained at a temperature of 10 to 80° C., in particular 20 to 70° C., and then, by introducing a gas mixture of the monomers used, that is, propylene and the $C_2$–$C_8$ 1-alkenes, under pressure, the pressure in the intermediate container is again raised by from 5 to 60 bar, and in particular by from 10 to 50 bar. In the intermediate container, the reaction mixture can also be reacted with conventional antistatic agents, such as polyglycol ether from fatty alcohols, fatty acids, and alkyl phenols, alkyl sulfates, and alkyl phosphates, as well as quaternary ammonium compounds.

After that, the propylene homopolymer, together with the Ziegler-Natta catalyst system, is discharged from the intermediate container and introduced into the second polymerization stage. In the second polymerization stage, a mixture of propylene and a $C_2$–$C_8$ 1-alkene is then added by polymerization to the propylene homopolymer, at a pressure of 10 to 50 bar, in particular 10 to 40 bar, a temperature of 50 to 100° C., in particular 60 to 90° C., and a mean dwell time of 0.5 to 5 hours, in particular 0.8 to 4 hours. The weight ratio between the monomers reacted in the first polymerization stage and the monomers reacted in the second polymerization stage is adjusted to be in the range of 4:1 to 1:1, in particular in the range from 4:1 to 1.5:1. As in the intermediate container, in the second polymerization stage as well, per kg of propylene copolymer, from 0.001 g to 10 g, in particular 0.005 g to 0.5 g of a $C_1$–$C_8$ alkanol can be added. For this purpose, isopropanol, glycol or ethanol is especially recommended. Suitable comonomers of the propylene in the second polymerization stage include among others ethylene and 1-butene. The proportion of the comonomer or comonomers of the propylene in the total gas mixture in the second polymerization stage is preferably from 15 to 60 vol.-%, in particular 20 to 50 vol.-%.

The propylene block copolymers of the invention obtained in this way have a melt flow rate (MFR), at 230° C. and at a weight of 2.16 kg, under ISO 1133, that satisfies the following equation (I):

$$MFR \geq 101.39 + 0.0787 * XS^2 - 5.4674 * XS, \quad (I)$$

in which XS stands for the proportion of propylene copolymer formed in the second polymerization stage, in percent, referred to the total propylene block copolymer.

The melt flow rate (MFR) of the propylene block copolymers obtained is as a rule in the range from 2 to 100 g/10 min, in particular in the range from 5 to 80 g/10 min, in each case at 230° C. and at a weight of 2.16 kg. The melt flow rate corresponds to the quantity of polymer that is expressed within 10 minutes from the test apparatus, standardized under ISO 1133, at a temperature of 230° C. and at a weight of 2.16 kg. The propylene block copolymers of the invention are produced without molar mass reduction by peroxides.

The propylene block copolymers of the invention are distinguished, among other properties, by high flowability, that is, an elevated melt flow rate, with simultaneously markedly increased rubber proportions, which means that the proportion of the propylene copolymer in the total propylene block copolymer is increased. The propylene block copolymers of the invention are furthermore characterized by high impact resistance and rigidity as well as by good thermostability and flowability in injection molding (spiral flow). Furthermore, they contain only relatively little of low-molecular ingredients, such as n-heptane or tert-butanol.

The method that is also according to the invention can be performed in a simple way in the usual reactors in plastics technology, without having to subject the propylene block copolymers obtained to a further molar mass reduction.

The propylene block copolymers of the invention are suitable above all for producing films, fibers and molded bodies.

EXAMPLES

In all the examples 1, 2 and 3 of the invention, and the comparison examples A, B and C, a Ziegler-Natta catalyst system was used that contained a titanium-containing solid component (a) produced by the following method.

In a first stage, a fine-particle silica gel, which had a mean particle diameter of 30 μm, a pore volume of 1.5 cm³/g, and a specific service area of 260 m²/g, was mixed with a solution of n-butyloctylmagnesium in n-heptane; per mol of $SiO_2$, 0.3 mol of the magnesium compound was used. The fine-particle silica gel was additionally characterized by a mean particle size of the primary particles of the 3 to 5 um and by voids and channels with a diameter of 3 to 5 μm; the macroscopic volumetric proportion of the voids and channels in the total particles was approximately 15%. The solution was stirred for 45 minutes at 95° C., then cooled down to 20° C., after which ten times the molar amount, referred to the organic magnesium compound, of hydrogen chloride was introduced. After 60 minutes, the reaction product was mixed, stirring constantly, with 3 mol of ethanol per mol of magnesium. This mixture was stirred for 0.5 hours at 80° C. and then mixed with 7.2 mol of titanium tetrachloride and 0.5 mol of di-n-butyl phthalate, in each case referred to 1 mol of magnesium. Stirring was then done for 1 hour at 100° C., and the solid material thus obtained was filtered off and washed multiple times with ethylbenzene.

The solid product obtained from this was extracted for 3 hours at 125° C. with a 10 vol.-% solution of titanium tetrachloride in ethylbenzene. After that, the solid product was separated from the extraction agent by filtration and washed with n-heptane until the extraction agent contained only 0.3 wt.-% of titanium tetrachloride.

The titanium-containing solid component (a) contained
3.5 wt.-% Ti
7.4 wt.-% Mg
28.2 wt.-% Cl.

Besides the titanium-containing solid component (a), triethylaluminum and dimethoxyisobutylisopropylsilane were used as cocatalysts, in accordance with the teaching of U.S. Pat. Nos. 4,857,613 and 5,288,824.

Examples 1, 2 and 3

In all the examples 1, 2 and 3 of the invention, the method was performed in two series-connected stirring autoclaves, equipped with a freely supported helical stirrer, each with a useful volume of 200 L. Both reactors contained a solid bed in motion of fine-particle propylene polymer.

In the first polymerization reactor, the propylene was introduced in gaseous form and polymerized at a mean dwell time, pressure and temperature as indicated in Table I. The Ziegler-Natta catalyst system used comprised the titanium-containing solid component (a), as well as triethylaluminum and isobutylisopropyldimethoxysilane as cocatalysts. The metered dosage of the solid component described was adjusted such that the transfer from the first to the second polymerization reactor is equivalent on average over time to the values shown in Table I. The metered dosage of this component was made with the fresh propylene added to regulate the pressure. Also added by metered dosage to the reactor were: triethylaluminum (in the form of a 1-molar heptane solution), in a quantity of 60 to a maximum of 105 ml/h, and isobutylisopropyldimethoxysilane (in the form of a 0.125 molar heptane solution), in a quantity of 70 to a maximum of 120 ml/h, as further catalyst components. To regulate the melt flow rate (under ISO 1133), hydrogen was added in metered form; the concentration of hydrogen in the reaction gas was monitored by gas chromatography.

Polymer granulate was removed successively from the reactor by briefly depressurizing the reactor via an immersion tube. The propylene homopolymer formed in the first reactor was as a result introduced discontinuously with the catalyst into an intermediate container, where it was mixed with isopropanol (in the form of a 0.5-molar heptane solution). The metered quantity of isopropanol added was adjusted such that the weight ratio between the propylene homopolymer obtained in the first reactor and the propylene copolymer produced in the second reactor achieves the values shown in Table I below. The quantity of isopropanol used can also be divided, in such a way that it is metered partly into the intermediate container and partly into the second reactor. In the intermediate container, the pressure in each case was lowered to 1 bar and maintained for 30 seconds, and then raised to 30 bar by introduction of a gas mixture under pressure, the gas mixture being equivalent to the composition in the second reactor.

The polymer powder was then introduced discontinuously from the intermediate container into the second reactor. There, a mixture of propylene and ethylene was added by polymerization to it at a total pressure, temperature and mean dwell time as shown in Table I. The proportion of ethylene in each case was approximately 30 vol.-%. The weight ratio between the propylene homopolymer formed in the first reactor and the propylene copolymer formed in the second reactor was monitored with the aid of the isopropanol added and is shown in Table 1.

The precise conditions in the examples 1, 2 and 3 of the invention, that is, the values for pressure, temperature and dwell time, the quantity of hydrogen used, and the quantity of cocatalysts used, the melt flow rate (MFR), and the transfer amount, that is, the quantity of each polymer obtained, are each shown for both polymerization reactors in Table I below. Table I also shows the weight ratio between the propylene homopolymer [PP (I)] formed in the first polymerization reactor and the propylene ethylene copolymer [EPR (II)] obtained in the second polymerization reactor.

The proportion of the propylene ethylene copolymer formed in the second reactor is calculated from the transfer and discharge amounts as follows:

$$\% \text{ of copolymer} = \frac{\text{discharge (second reactor)} - \text{transfer (first reactor)}}{\text{discharge (second reactor)}}$$

The properties of the products obtained are summarized, together with the comparison examples (comparison examples 1', 2' and 3') in Tables III, IV and V.

TABLE I

| | Example 1 | Example 2 | Example 3 |
|---|---|---|---|
| Reactor I | | | |
| Pressure (I) [bar] | 32 | 32 | 22 |
| Temperature (I) [° C.] | 80 | 80 | 70 |
| Hydrogen (I) [vol.- %] | 10.9 | 9.5 | 6.3 |
| Quantity of isobutylisopropyl-dimethoxysilane (0.125 mol) [ml/h] | 103 | 120 | 70 |
| Quantity of triethylaluminum (1 mol) [ml/h] | 90 | 105 | 60 |
| Dwell time (I) [h] | 1.5 | 1.3 | 2.3 |
| MFR (I) [g/10 min] | 190 | 180 | **5 |
| Transfer [kg/h] | 30 | 35 | *9 |
| Reactor II | | | |
| Pressure (II) [bar] | 15 | 18 | 22 |
| Temperature (II) [° C.] | 70 | 70 | 70 |
| Hydrogen (II) [vol.- %] | 1.5 | 1.2 | 0.9 |
| Ethylene [vol.- %] | 30.6 | 29.4 | 29.4 |
| Dwell time (II) [h] | 1.2 | 1.0 | 1.1 |
| Output [kg/h] | 38.6 | 46.8 | 42.9 |
| MFR (II) [g/10 min] | 51 | 31 | 7.5 |
| Weight ratio PP (I):EPR (II) | 4:1 | 3.3:1 | 2:1 |

Comparison Examples 1', 2' and 3'

In all the comparison examples 1', 2' and 3', the method was performed in two series-connected stirring autoclaves, equipped with a freely supported helical stirrer, each with a useful volume of 200 L. Both reactors contained a solid bed in motion of fine-particle propylene polymer.

In the first polymerization reactor, the propylene was introduced in gaseous form and polymerized at a mean dwell time of 2.3 hours, with the aid of a Ziegler-Natta catalyst comprising the titanium-containing solid component (a), triethylaluminum and isobutylisopropyldimethoxysilane, at a pressure and temperatures as shown in Table II. The metered dosage of the solid component described was adjusted such that the transfer from the first to the second polymerization reactor is equivalent on average to the values shown in Table II. The metered dosage of this component was made with the fresh propylene added to regulate the pressure. Triethylaluminum (in the form of a 1-molar heptane solution), in a quantity of 60 ml/h, and 72 ml/h of isobutylisopropyldimethoxysilane (in the form of a 0.125 molar heptane solution), were also added to the reactor in metered form, as further catalyst components. For regulating the melt flow rate (under ISO 1133), hydrogen was added in metered form; the concentration of hydrogen in the reaction gas was monitored by gas chromatography.

Polymer granulate was removed successively from the reactor by briefly depressurizing the reactor via an immersion tube. The propylene homopolymer formed in the first reactor was as a result introduced discontinuously with the catalyst and introduced together with unreacted monomers into the second reactor, but without depressurizing this in an intermediate container.

There, a mixture of propylene and ethylene was added by polymerization, at a total pressure, temperature and mean dwell time as shown in Table II. The proportion of ethylene in each case was approximately 30 vol.-%. The weight ratio between the propylene homopolymer [PP (I)] formed in the first reactor and the propylene copolymer [EPR (II)] formed in the second reactor is shown in Table II. Also added in metered form to the second reactor was isopropanol (in the form of a 0.5 molar heptane solution). The quantity of isopropanol added in metered form was adjusted such that the weight ratio between PP (I) and EPR (II) shown in Table II was maintained.

The propylene block copolymers obtained in comparison examples 1', 2' and 3' were then, after a molar mass reduction with peroxides using a 5 wt.-% solution of di-tert-butylperoxide in n-heptane (Luperox® 101, made by Interox/Peroxid-Chemi) in a double worm extruder (ZSK 30, Worm 8 A, made by Werner & Pfleiderer). In this way, it was possible to increase its melt flow rate (MFR) markedly. The melt flow rates before (MFR II) and after the molar mass reduction (MFR after reduction) are shown in Table II below.

TABLE II

|  | Comparison Example 1' | Comparison Example 2' | Comparison Example 3' |
|---|---|---|---|
| Reactor I |  |  |  |
| Pressure (I) [bar] | 32 | 32 | 22 |
| Temperature (I) [° C.] | 80 | 80 | 80 |
| Hydrogen (I) [vol.-%] | 0.4 | 0.9 | 0.4 |
| Quantity of isobutylisopropyl-dimethioxysilane (0.125 mol) [ml/h] | 72 | 72 | 72 |
| Quantity of triethylaluminum (1 mol) [ml/h] | 60 | 60 | 60 |
| Dwell time (I) [h] | 2.3 | 2.3 | 2.3 |
| MFR (I) [g/10 min] | 3.5 | 16 | 15 |
| Transfer [kg/h] | 20 | 20 | 20 |
| Reactor II |  |  |  |
| Pressure (II) [bar] | 15 | 15 | 23 |
| Temperature (II) [° C.] | 70 | 70 | 70 |
| Vol.-% hydrogen (II) [vol.-%] | 1.6 | 3.8 | 2.1 |
| Vol-% ethylene [vol.-%] | 30 | 30 | 30 |
| Dwell time (II) [h] | 1.8 | 1.8 | 1.5 |
| Output [kg/h] | 25 | 26.8 | 30.2 |
| MFR (II) [g/10 min] | 2 | 7.5 | 3.5 |
| MFR after reduction [g/10 min] | 48 | 31 | 7 |
| Weight ratio PP(I):EPR(II) | 4:1 | 3:1 | 2:1 |

In Tables III, IV and V that follow, the results of measurements of the propylene block copolymers, obtained in examples 1, 2 and 3 of the invention, are compared with measurements made for propylene block copolymers not according to the invention, in the comparison examples 1', 2' and 3'. The following properties were measured:

| Properties: | Method |
|---|---|
| XS (xylene solubles): | ASTM D5492-98 Standard Test Method for Determination of Xylene Solubles in Propylene Plastics |
| Limit viscosity of rubber phase (propylene copolymer): | As the so-called rubber phase, the combined fractions of a TREF fractionation were used, which were eluted at temperatures below 80° C. in xylene. The determination of the limit viscosity was done in decalin at 135° C. in accordance with ISO 1628. |
| MFR (I); MFR (II); MFR (after reduction) [g/10 min]: | ISO 1133, 230° C., 2.16 kg |
| Crossover module and polydispersion index (PI) of the propylene homopolymer (matrix): | ISO 6721-10; as the matrix, the combined fractions of a TREF fractionation were defined, which are eluted at temperatures above 90° C. in xylene. Apparatus: RDS2 with plate/plate geometry, diameter = 25 mm, amplitude = 0.05–1, preheating time = 5–10 min, T = 170–220° C. |
| Determination of the PI value: | PI = 54.6 × (modulus separation)$^{-1.76}$ |
| | $$\text{modulus separation} = \frac{(G' = 500 \text{ Pa})^\nu}{(G'' = 500 \text{ Pa})^\nu}$$ |
| | $\nu$ = frequency |
| Spiral flow: | ISO 1133, peak pressure 100 bar, T = 250° C. |
| Vicat A temperature: | ISO 306, VST A50 |
| Thermostability B: | ISO 75-2 (120 × 10 × 4 mm) |
| TREF fractionation: | per L. Wild, Temperature rising elution fractionation, Adv. Polym. Sci. 98, 1–47 (1990). Fractions were eluted with xylene at 40, 80, 90, 100, 120 and 125 C. |
| Volatile components, oligomers, proportions of tert-butanol and n-heptane: | Head-space gas chromatography, 60 m DB-1, film 1 μm, specimen weight: 1 g; scavenging gas: He, tempering: 1 h at 120° C., evaluation: mass proportion in ppm, ext. standard. |
| Modulus of elasticity and tension: | DIN 53457 |
| Impact bending test (ack) at 0° C. and 23° C.: | ISO 179-2/1eA (F); ISO 179-2/1eU |

TABLE III

|  | Example 1 | Comparison Example 1' |
|---|---|---|
| MFR (I)/MFR (II)/MFR (after reduction) | 190/51/51 | 3.5/2/48 |
| XS [%] | 21 | 21.1 |
| Modulus of elasticity [MPa] | 1126 | 1051 |
| ack (23° C.) [kJ/m$^2$] | 7.8 | 7.5 |
| ack (0° C.) [kJ/m$^2$] | 5.6 | 5.8 |
| Spiral flow [cm] | 113 | 97 |
| Thermostability B [° C.] | 87 | 77 |
| Vicat A [° C.] | 144 | 140 |
| P.I., matrix | 3.19 | 2.59 |
| Crossover module, matrix [Pa] | 16,000 | 35,800 |
| Limit viscosity rubber [$\eta_{rubber}$, dl/g] | 3.73 dl/g | 1.67 dl/g |
| Proportion of tert-butanol [ppm] | <1 ppm | 4 ppm |
| Proportion of n-heptane [ppm] | 15 ppm | 647 ppm |

TABLE IV

|  | Example 2 | Comparison Example 2' |
|---|---|---|
| MFR (I)/MFR (II)/MFR (after reduction) | 180/31/31 | 16/7.5/31 |
| XS [%] | 23 | 22 |
| Modulus of elasticity [MPa] | 1037 | 1074 |
| ack (23° C.) [kJ/m$^2$] | 10.2 | 7.2 |
| ack (0° C.) [kJ/m$^2$] | 6.5 | 5.6 |
| Spiral flow [cm] | 101 | 92 |
| Thermostability B [° C.] | 81 | 74 |
| Vicat A [° C.] | 142 | 140 |
| P.I., matrix | 3.17 | 2.52 |

TABLE IV-continued

|  | Example 2 | Comparison Example 2' |
|---|---|---|
| Crossover module, matrix [Pa] | 7,000 | 34,100 |
| Limit viscosity rubber [$n_{rubber}$, dl/g] | 3.98 dl/g | 1.68 dl/g |
| Proportion of tert-butanol [ppm] | <1 ppm | 4 ppm |
| Proportion of n-heptane [ppm] | 9 ppm | 671 ppm |

TABLE V

|  | Example 3 | Comparison Example 3' |
|---|---|---|
| MFR (I)/MFR (II)/ MFR (after reduction) | 115/7.5/7.5 | 15/3.5/7 |
| XS [%] | 32 | 33 |
| Modulus of elasticity [MPa] | 745 | 613 |
| ack (23° C.) [kJ/m$^2$] | 59 | 66 |
| ack (0° C.) [kJ/m$^2$] | 20 | 67 |
| Spiral flow [cm] | 74 | 60 |
| Thermostability B [° C.] | 67 | 62 |
| Vicat A [° C.] | 41 | 37 |
| P.I., matrix | 3.52 | 2.78 |
| Crossover module, matrix [Pa] | 35,000 | 39,000 |
| Limit viscosity rubber [$n_{rubber}$, dl/g] | 4.68 dl/g | 2.68 dl/g |
| Proportion of tert-butanol [ppm] | <1 ppm | 15 ppm |
| Proportion of n-heptane [ppm] | 36 ppm | >500 ppm |

The invention claimed is:

1. A method for producing a highly flowable propy-lene block copolymer comprising
50 to 80 wt.-% of a propylene homopolymer, and
20 to 50 wt.-% of a propylene copolymer,
wherein the propylene copolymer comprises from 10 to 70 wt.-% of a C$_2$–C$_8$ 1-alkene other than propylene,
the highly flowable propylene block copolymer being obtained by two-stage polymerization by means of a Ziegler-Natta catalyst system from a gas phase reaction comprising
in a first polymerization stage, propylene monomer is polymerized in a reaction mixture forming a propylene homopolymer at a pressure of 10 to 50 bar and a temperature of 50 to 100° C., the reaction mixture having a mean dwell time of 0.3 to 5 hours in presence of at least 5.0 vol.-% of hydrogen in proportion to a total volume of the reaction mixture;
the propylene homopolymer obtained in the first polymerization stage and the Ziegler-Natta catalyst system is introduced into an intermediate container, wherein the propylene homopolymer and the Ziegler-Natta catalyst system are depressurized to less than 3.5 bar for a period of time of 0.1 to 5 minutes and are maintained at a temperature of 10 to 80° C., with pressure then being raised after the period of time of 0.1 to 5 minutes by 5 to 60 bar; and
the propylene homopolymer along with the Ziegler-Natta catalyst system is transferred to a second polymerization stage, wherein a mixture of propylene monomer and C$_2$–C$_8$ 1-alkene monomer excluding propylene is added to the propylene homopolymer by polymerization at a pressure of 10 to 50 bar, a temperature of 50 to 100° C., and a mean dwell time of 0.5 to 5 hours;
wherein a weight ratio between the propylene monomer and the C$_2$–C$_8$ 1-alkene monomer excluding propylene in the highly flowable propylene block copolymer is adjusted to be in the range of 4:1 to 1:1 and the highly flowable propylene block copolymer obtained has an MFR from 2 to 100 g/10 min.

2. The method of claim 1, wherein the Ziegler-Natta catalyst system comprises a titanium-containing solid component which comprises a halogen-containing magnesium compound, an electron donor, and an inorganic oxide.

3. The method of claim 2, wherein the Ziegler-Natta catalyst system further comprises an aluminum compound and an additional electron donor compound.

4. The method of claim 1, wherein in the first polymerization stage, propylene monomer is polymerized forming a propylene homopolymer at a pressure of 15 to 40 bar and at a temperature of 60 to 90° C.

5. The method of claim 1, wherein 0.001 to 10 g of a C$_1$–C$_8$-alkanol is added in the intermediate container per kg of the propylene homopolymer.

6. The method of claim 1, wherein after the depressurization in the intermediate container, the pressure is raised by 10 to 40 bar.

7. The method of claim 1, wherein in the second polymerization stage, the mixture of the propylene monomer and the C$_2$–C$_8$ 1 -alkene monomer excluding propylene are polymerized with one another at a pressure of 10 to 40 bar and at a temperature of 60 to 90° C.

8. The method of claim 1, for producing a highly flowable propylene polymer wherein the MFR at 230° C. and at a weight of 2.16 kg measured by ISO standard 1133, obeys equation (I):

$$MFR \geq 101.39 + 0.0787 \cdot XS^2 - 5.4674 \cdot XS \quad (I)$$

wherein XS stands for a proportion of propylene copolymer formed in the second polymerization stage as a percent relative to the highly flowable total propylene block copolymer total.

* * * * *